United States Patent Office 3,295,071
Patented Dec. 27, 1966

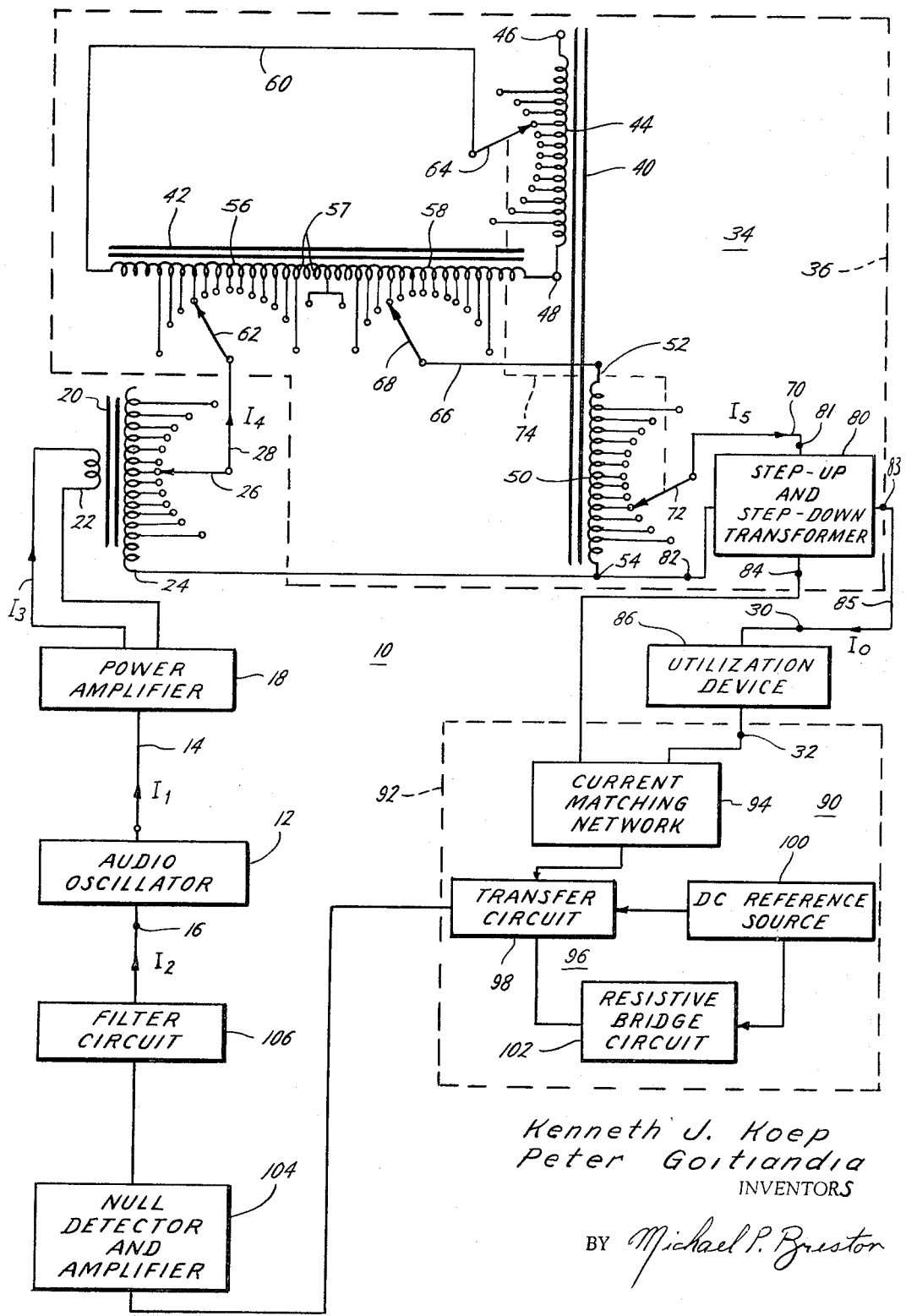

3,295,071
VARIABLE CURRENT SUPPLY SYSTEM HAVING FEEDBACK LOOP FOR OUTPUT REGULATION
Kenneth J. Koep, South Plainfield, and Peter Goitiandia, Irvington, N.J., assignors to Weston Instruments, Inc., a corporation of Texas
Filed Feb. 17, 1964, Ser. No. 345,245
1 Claim. (Cl. 331—183)

This invention relates to an A.C. current calibrator and more particularly to a precision A.C. current calibrating device which includes a feedback loop for accurately controlling and regulating the calibrator's output current to a utilization device as to an instrument for calibration.

Often, it is necessary to provide to a utilization device a regulated A.C. current in the audio frequency range, say between 50 c.p.s. to 10 kc. or higher. It is desired then that the amplitude of the current supplied to the utilization device, hereinafter to be referred to as the output current, remain at any desired current level, depending upon what current level is being calibrated, within prescribed limits of load variations. An impedance load variation can be caused by a different utilization device, by a change in the output setting of a transformer which would be used, by any other elements connected in the output circuitry with the utilization device, by a different frequency setting at which the calibration occurs, as well as other physical environmental operating conditions.

Various current calibrating devices are known in the art. Their use, however, necessitates accurate adjustments of circuit control elements to obtain each standardized output current. For high precision calibration of test instruments, the collaboration of two operators is frequently necessary. One operator makes suitable circuit adjustments to observe on the scale of known standard indicating instruments the desired current and then orders a second operator to calibrate the test instrument. Obviously, such prior art calibrating methods are wasteful of both time and money.

Accordingly, it is a main object of this invention to provide a new and improved calibrating apparatus which can calibrate a relatively large number of test instruments in a relatively short time, thereby reducing appreciably the cost of calibration.

Another object of this invention is to provide a new and improved calibrating apparatus which includes a novel current divider from which discrete output currents are obtainable merely by actuating a few switches.

It is a further object of this invention to provide a variable, settable current supply which provides a predetermined range of output A.C. currents, the amplitude of each output current being substantially independent of load variations.

Yet, another object of this invention is to provide a new and improved current calibrating apparatus which is accurate, which has a low frequency distortion, which is very stable, and which can provide a wide range of output currents over a relatively wide frequency band.

A still further object of this invention is to provide a new and improved A.C. calibrating instrument with a feedback path for stabilizing the calibrator's output currents with load variations.

These and other objects of this invention are accomplished by providing a novel current calibrator including a variable-frequency, audio-power source coupled to a current-divider network capable of subdividing each current range into several thousand parts to obtain a desired current level output. A utilization device, which is being calibrated, is connected to the output of the current-divider network. A current matching network is connected in series with the utilization device and the output of the current-divider network. The current matching network supplies to a standardization circuit a current which is representative of the output current through the utilization device. The standardization circuit, in which a reference is established, compares this reference current with the input from the current matching network and generates an error signal when there is a difference which exceeds a predetermined value. The error signal is applied through feedback path to a control terminal in the audio-power source to adjust its output by an amount sufficient to minimize said difference.

The above and other objects and advantages of this invention will become apparent from the following description when taken in conjunction with the accompanying drawing wherein the sole figure shows a schematic diagram of a preferred embodiment of the current calibrating apparatus in accordance with this invention.

Referring to the drawing, the current calibrating apparatus is generally designated as 10. It includes an audio oscillator 12 for providing an output current $I_1$ on line 14. The audio oscillator 12 is of the variable frequency type whereby the frequency of $I_1$ may range, in a practical apparatus, say, between 50 c.p.s. to 10 kc. and higher. It is desired that the amplitude of $I_1$ be substantially independent with frequency. Oscillator 12 has a control terminal 16. When a control or error signal $I_2$ is applied to control terminal 16, the amplitude $I_1$ varies as a function of $I_2$ in a manner fully explained subsequently.

Current $I_1$ is conveniently applied to a power amplifier 18 having desirably a linear frequency response within the calibrator's frequency range. The output current $I_3$ from amplifier 18 is fed to an isolation transformer 20 having a primary winding 22 and a tapped secondary winding 24. A multi-position switch 26 conducts from winding 24 to line 28 a current $I_4$.

To provide to the calibrator's output terminals 30, 32 a wide range of discrete output currents $I_0$, there is provided a novel arrangement of auto transformers forming a current-divider network which is designated as 34 and is shown enclosed in the dotted block 36. The number of auto transformers in the current-divider network 34 depends on the number of ranges and settings desired. For simplicity, only a minimum number of auto transformers is shown. Forming the heart of network 34 are two cores 40 and 42, each made preferably of high permeability material of toroidial configuration. A winding 44 having terminals 46 and 48 and a winding 50 having terminals 52 and 54 are symmetrically wound on core 40 to achieve an output current $I_0$ substantially independent of the frequency settings on the audio oscillator 12. On core 42 are also wound two windings 56, 58 connected in series to form a winding 57. One end of winding 57 is connected to terminal 48 of winding 44 and the other end is connected to a line 60. Each of windings 44, 50, 56 and 58 has a number of taps. Making contact with the taps on winding 56 is the blade arm of a multi-position switch 62 to which is connected line 28. Similarly, line 60 is connected to a multi-position switch 64 making contact with winding 44. Line 66 connects the upper terminal 52 of winding 50 to a multi-position switch 68, making contact with the taps on winding 58. Finally, line 70 is connected to switch 72 for selectively contacting the taps on winding 50. Switches 64 and 72 are mechanically ganged as shown by the dotted line 74.

Appearing on line 70 is a current $I_5$ whose amplitude is a function of the positions of the various switches.

To achieve a greater number of ranges, say between 10 milliamps and 100 amperes, a transformer 80 is provided capable of acting either in a step-up or step-down fashion. Transformer 80 has input terminals 81, 82 and output terminals 83, 84. Line 70 is connected to terminal 81 and the lower terminal 54 of winding 50 is connected to terminal 82.

To make the desired current level output $I_0$ on line 85, connecting terminals 30 and 83, substantially independent of load variations presented by a utilization device 86 coupled to output terminals 30, 32, the output current $I_0$ is sensed by a current sensor-and-comparator network, generally designated as 90, shown enclosed in the dotted block 92. Network 90 includes a current matching network 94 for feeding to a standardization circuit, generally designated as 96, a sample of the output current $I_0$.

The standardization circuit 96 includes a transfer circuit 98, a D.C. reference source 100, and a resistive bridge circuit 102, all cascaded in series to form a loop as shown. The standardization circuit 96 is well known in the art. The operation of such a circuit is discussed in detail in the A.I.E.E. Communications and Electronics Papers, July, 1962, pages 179–186, entitled "Audio Voltage Calibrating Standard" by K. J. Koep. (See particularly FIGURES 3 and 6 and the discussions related thereto.) While the paper is concerned with a voltage calibrator, the principle of the standardization circuit is equally applicable to the current calibrator of this invention. Also, the standardization circuit 96 is similar to that disclosed in applicant's co-pending application Serial Number 258,-580 assigned to the same assignee as this invention. The output of the transfer circuit 98 is connected to a null detector and amplifier 104 which is coupled conveniently through a filter circuit 106 to the control terminal 16 of the audio oscillator 12.

In a typical operation of the feedback loop, a stable noise free D.C. signal is provided by the D.C. reference source 100 and is used as the standard of the calibrating system. An A.C. current is provided by the current matching network 94 to the transfer circuit 98. As previously mentioned, in a typical embodiment of the calibrating system of this invention, the output current $I_0$ may vary between 10 milliamperes to 100 amperes. Because of this extensive output current range, it is desired to present to the transfer circuit 98 only a portion of the output current $I_0$ if the output current $I_0$ exceeds a certain range of values. The current transformation is accomplished by the current matching network 94 which may include step-up or step-down transformers and/or suitably connected precision shunts. An example of such a current transformer, which uses multiple primary taps, is the Model 327 Current Transformer described in Weston Instruments catalog 06–200, dated October 1959. A general discussion of such current transformers can be found in "Instrument Transformers" by B. Hague (Pitman and Sons, Ltd., London, 1936).

Best results are achieved if the portion of the output current provided by the current matching network 94 to the transfer circuit 98 is substantially constant. In one embodiment of the invention, the transfer circuit 98 received only 10 milliamperes of A.C. current from the current matching network 94 regardless of the output current $I_0$ supplied to the utilization device 86. However, whenever the current divider switches are changed a load variation occurs; hence, the output of current matching network 94 is changed somewhat. The transfer circuit 98 and the resistive bridge circuit 102 compare the D.C. reference current signal provided by the D.C. reference source 100 with the signal supplied by the current matching network 94. If the two signals are equal to within a preselected reference value, then a control or error signal below a predetermined level is supplied to the null detector and amplifier 104. On the other hand, if the difference between the two signals supplied to the transfer circuit 98 exceeds said predetermined level, then a corresponding error signal is supplied to a null detector and amplifier 104.

The amplified error signal $I_2$, after being filtered by a filter circuit 106, is applied to the control terminal 16 of the audio oscillator 12 for adjusting its output current $I_1$ by an amount corresponding to the error signal. The oscillator's output $I_1$ is amplified by the power amplifier 18 which feeds the current $I_3$ to the isolation transformer 20. By suitably positioning switches 26, 62, 68, and ganged switches 64–72, it is possible to obtain a wide range of currents $I_5$ on line 70. More extensive ranges are achieved by employing the transformer 80 so that the output current $I_0$ on line 85 may range in a practical embodiment from 10 milliamps to 100 amperes.

It will therefore be appreciated that the calibrator 10 of this invention can provide a wide range of discrete current values $I_0$ to the utilization device 86, the selection of output currents being accomplished automatically by the mere actuation of a few switches. Even though, ordinarily, the output current $I_0$ may be expected to vary with various loads, as discussed in the introduction, because of the dynamic feedback loop, the output current $I_0$ remains substantially at the level indicated by a switch setting.

Although for the purpose of explaining the invention, a particular embodiment thereof has been shown and described, obvious modifications will occur to those skilled in the art, and it is not desired to be limited to the exact details shown and described.

We claim:

A variable current supply system comprising: a source of A.C. power; a utilization device adapted to the energized by said source of A.C. power; current ratio means having an input and output, the input being coupled directly to the power source and the output being directly coupled to said utilization device, said current ratio means selected currents for said output; a current matching network, in series relationship with the current ratio means and utilization device, for sensing the current through the utilization device and producing an output signal representative thereof; a standardization circuit having a source of fixed reference current, and including means for comparing the output signal of the current matching network with said reference current and generating an error signal representative of the algebraic sum of said output signal of said current matching network and said reference current, whenever said sum exceeds a predetermined value; and means coupled to the standardization circuit and power source for applying a control signal to the power source, representative of said error signal, to control the amplitude of output current from said A.C. power source by an amount and in a direction dependent upon the magnitude and sense of said control signal, so that the current through the utilization device remains at any desired current level; wherein said current ratio means includes a first core; a second core; a first winding; a second winding; a third winding, said first and second windings being wound on said first core, said third winding being wound on said second core; first switching means coupling portions of said second winding to said third winding in series circuit relationship; second switching means coupling portions of said third winding to said first winding in series circuit relationship across the power source; and third switching means coupling portions of said first winding to said utilization device.

References Cited by the Examiner

UNITED STATES PATENTS 3,144,619  8/1964  Cochran _____ 331—109

OTHER REFERENCES

Koep et al.: "Audio Voltage Calibrating Standard" A.I.E.E. Transactions-Communications and Electronics, vol. 1, part 1, No. 61, July 1962, pp. 179–186.

Light: "Transistor Power Supplies," Wireless World, December 1955, pp. 582–586.

ROY LAKE, *Primary Examiner.*

J. B. MULLINS, N. KAUFMAN, *Assistant Examiners.*